July 22, 1969  R. C. GOTBERG  3,457,016

WAXER

Filed April 25, 1967

INVENTOR.
ROLAND C. GOTBERG

BY

HIS ATTORNEY

United States Patent Office 3,457,016
Patented July 22, 1969

3,457,016
WAXER
Roland C. Gotberg, 328 East 8000 South,
Sandy, Utah 84070
Filed Apr. 25, 1967, Ser. No. 633,561
Int. Cl. A47l *11/03*
U.S. Cl. 401—131                              9 Claims

ABSTRACT OF THE DISCLOSURE

A floor waxer having a pressurized treating solution reservoir supported on an elongated handle which is pivotally connected at one end to a fabric covered spreader plate adapted to be drawn over the floor to be treated. A nozzle is provided in communication with the reservoir for spraying liquid wax in front of the spreader plate as it is drawn over the floor and a hand valve can be interposed between the reservoir and the nozzle to control the spray passing through the nozzle.

---

This invention relates to a floor waxer, and in particular to a liquid wax dispensing device adapted to spread a uniform coat of wax over a plane surface.

It is conventional practice to maintain floors, and the like, with a liquid treating solution such as floor wax, and the like. When large areas are to be treated with the solution substantial time is required to complete the treatment since the solution must be first sprayed or otherwise spread over the surface and then, in a separate operation, it has to be worked into and over the floor in a substantial uniform layer.

It is accordingly the principal object of this invention to provide a floor waxer which dispenses liquid wax onto a surface while simultaneously working the wax into and over the surface in a substantially uniform layer. It is a further object of this invention to provide a floor waxer which is easy to operate, simple in design, and inexpensive to construct.

Briefly, the invention comprises a pressurized liquid wax reservoir supported on an elongated handle which is connected at one end to a spreader plate having a substantially plane bottom surface adapted to be drawn with said handle over the floor to be treated. A nozzle is provided in communication with the reservoir for spraying liquid wax in front of the spreader plate as it is drawn over the floor. Preferably, a hand valve is interposed between the reservoir and the nozzle to control the flow of liquid through the nozzle as the spreader plate is drawn over the floor. In the most preferred embodiment of this invention, the spreader plate is an elongated plate, positioned normal to the handle of the spreader, and a plurality of spreading nozzles are provided along the plate thereby allowing the waxer to treat a large area during each pass of the device over the floor.

So that the invention may be more readily understood and carried into effect, reference is made to the accompanying drawings, which are offered by way of example only and are not to be taken as limiting the invention, the scope of which is defined by the appended claims, which obviously embrace equivalent structures and processes.

Figure 1:
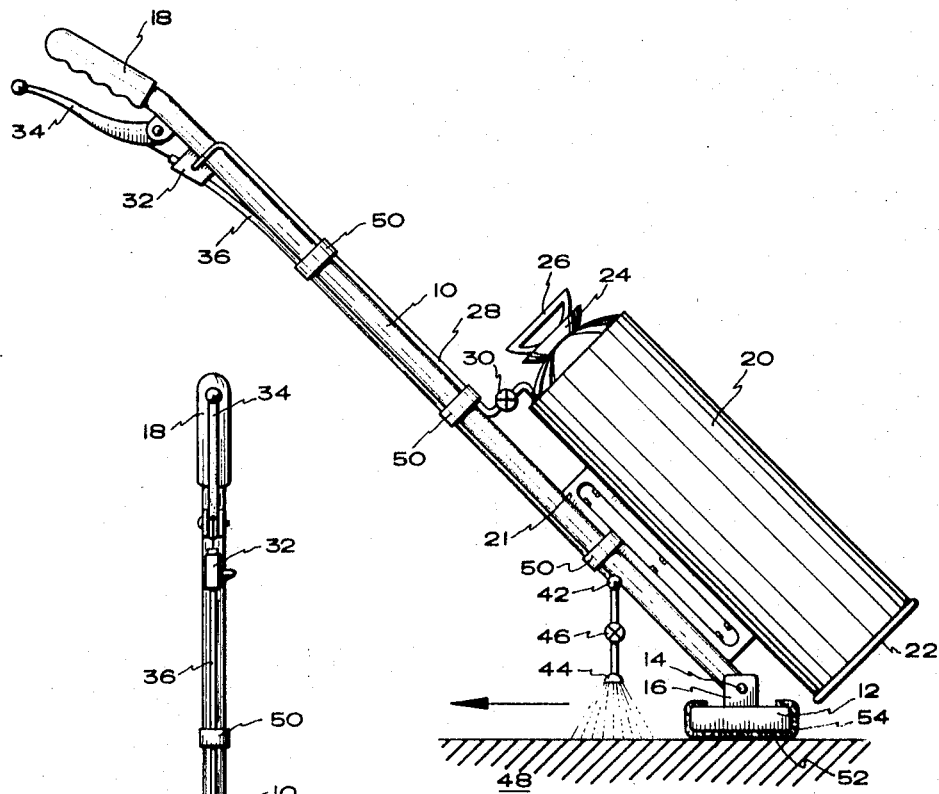
FIG. 1 is a plan view of the floor waxer of this invention showing it in an operative position as it is drawn across a floor.

Referring now more particularly to the drawings, there is shown the floor waxer of this invention which includes elongated handle 10 with spreader plate 12 pivotally connected to said elongated handle at its bottom end with shaft 14 which passes through said handle and mounting bracket 16, which bracket is secured at its base to spreader plate 12 in a conventional fashion. Grip 18, sized to be easily received within the hand of individual manipulating the waxer, is attached to the end of handle 10 opposite from spreader plate 12. Liquid wax reservoir 20 is mounted on handle 10 with bracket 21. Preferably reservoir 20 is positioned so that the waxer is entirely supported by substantially plane reservoir bottom 22 when handle 10 is rotated to a substantially vertical position. Reservoir 20 is a conventional pressure vessel enclosed at its top end with filler cap 24. In addition the reservoir is fitted with a conventional air pressure pump 26 for pressurizing said reservoir.

In operation, a conventional floor treating solution such as liquid floor wax is placed in reservoir 20 through its open top end by removing cap 24. When a predetermined amount of solution is in the reservoir, said cap is replaced to make the reservoir substantially air tight. Thereafter, pump 26 is activated to pressurize the reservoir. Conduit 28, with shut-off valve 30, is provided in communication with the interior of reservoir 20, and when the reservoir is pressurized, the treating solution is forced into said conduit. Control valve 32 operated with lever 34 is provided in conduit 28 to readily control the flow of solution through conduit 28. The control valve is opened when the person operating the waxer manually depresses lever 34 towards grip 18. When valve 32 is open pressurized solution flows into conduit 36 to headers 38 and 40 where the solution is divided into two streams. Said headers terminate in a conventional ball joint connectors 32 which in turn pass the treating solution into valved extension members 36 and to nozzles 44 where the liquid treating solution is sprayed under pressure, onto floor 48. The valves in extension members 46 are used to control the volume of fluid flowing through each nozzle. By using a ball connection 44 the extension members can be turned on headers 38 and 40 to direct spray in any predetermined direction onto floor 48. Preferably, the headers are positioned in a direction normal to handle 10 and substantially parallel with floor 48. Conduits 28 and 36, with connected headers and nozzles, are fixedly attached to handle 10 with conventional brackets 50.

The device of this invention can be used to spread a relatively uniform layer of treating solution such as liquid wax on floor 48 by slowly drawing the device with handle 10 over the surface of said floor 48 while depressing lever 34. After the treating solution is sprayed onto the floor it is spread thereover with spreading plate 12 which is drawn over the liquid. To insure that the solution is uniformly distributed over the floor, spreader plate 12 is provided with a substantially plane bottom surface 52. Preferably, surface 52 is covered with an absorbing fabric such as wool, cotton, and the like, which acts as a secondary reservoir when the plate is drawn over a surface. By merely varying the quantity of treating solution in reservoir 20, the pressure exerted by spreading plate 12 on floor 48 is modified to vary the operation of the waxer. When treating solution is being sprayed onto the floor, nozzles 44 should be positioned in front of spreading plate 12 as the plate is drawn over the floor so that the liquid will be properly worked into and over the floor's surface.

Figure 2:
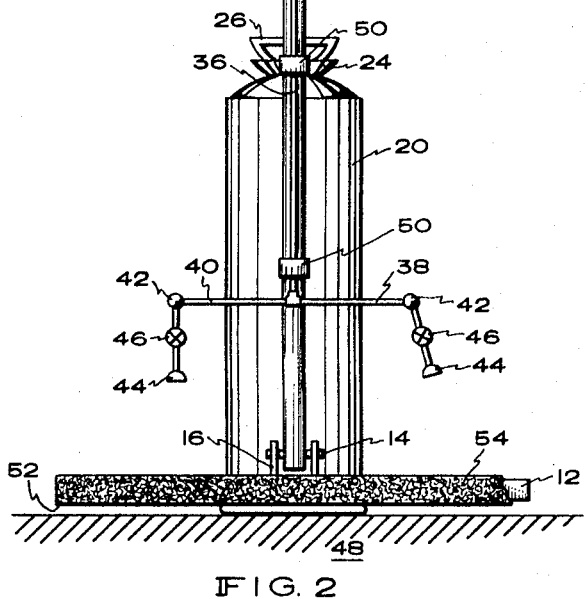
FIG. 2 is a front view of the floor waxer showing the device in its storage position supported on the base of the liquid wax reservoir, and particularly showing the preferred arrangement between the spray nozzles and the spreader plate.

The device of this invention can be used as a spreading device by merely releasing lever 34 thereby closing spring loaded valve 32 to prevent liquid from spraying through nozzle 44. When used in this fashion the waxer can be moved in any direction. As previously indicated, when the waxer is not in use, or when reservoir 20 is being filled, the waxing device is supported in a vertical position on the reservoir's bottom 22, as illustrated in FIG. 2.

I claim:

1. A floor treating device comprising an elongated handle connected at one end to a spreader plate having a bottom surface adapted to be drawn with said handle over a surface to be treated; a treating solution reservoir having a substantially plain bottom secured to said handle in a position to support said treating device substantially entirely on said plain bottom of said reservoir when said handle is in a vertical position; pressurizing means provided in communication with said reservoir for pressurizing solution in said reservoir; conduit means in communication with said reservoir for passing pressurized treating solution to nozzle means positioned to spray said solution on said surface to be treated as said spreader plate is drawn thereover.

2. The floor treating device of claim 1 wherein said bottom surface of said spreader plate is covered with an absorbing fabric.

3. The floor treating device of claim 1 wherein a valve is deposed in said conduit means between said reservoir and said nozzle means for controlling the flow of solution through said nozzle means.

4. The floor treating device of claim 3 wherein said valve is a normally closed valve which is opened by depressing a lever secured to said handle proximate its end opposite from said spreader plate.

5. The floor treating device of claim 1 wherein a plurality of nozzles are provided in communication with said conduit means.

6. The floor treating device of claim 5 wherein each of said nozzle means are provided with independent valve means for controlling the flow of treating solution through said nozzle means.

7. The floor treating device of claim 6 wherein said spreader plate is an elongated member connected normal to said handle.

8. The floor treating device of claim 7 wherein said nozzles are positioned along said elongated spreader plate.

9. The spreader device of claim 8 wherein each of said nozzle means is connected to said conduit means with ball connectors wherein said nozzles can be moved on said conduit means to a predetermined position.

References Cited

UNITED STATES PATENTS

| 419,871 | 1/1890 | Orcutt | 15—546 |
| 595,761 | 12/1897 | Brockmann | 15—546 |
| 1,749,326 | 3/1930 | Dirkes et al. | 118—2 |
| 2,047,199 | 7/1936 | Gewalt | 15—546 |
| 2,162,310 | 6/1939 | Korsen | 15—546 |
| 2,228,573 | 1/1941 | Lowe | 15—546 |
| 2,768,401 | 10/1956 | Becker et al. | 15—546 |
| 2,979,756 | 4/1961 | Wallis | 15—546 |
| 3,094,152 | 6/1963 | Kenny et al. | |
| 3,099,028 | 7/1963 | Ardito | 15—546 XR |
| 3,126,573 | 3/1964 | Vosbikian et al. | 15—546 |
| 3,208,094 | 9/1965 | Pilkington | 15—546 |

FOREIGN PATENTS

| 280,171 | 8/1927 | Great Britain. |
| 311,873 | 10/1933 | Italy. |

ROBERT W. MICHELL, Primary Examiner
ROBERT I. SMITH, Assistant Examiner

U.S. Cl. X.R.

401—138, 140